United States Patent [19]

Brokaw

[11] 4,057,952
[45] Nov. 15, 1977

[54] ROTARY MOWER AND SHREDDER DEVICE

[76] Inventor: George K. Brokaw, 110 Forest Lane, Berkeley, Calif. 94708

[21] Appl. No.: 650,508

[22] Filed: Jan. 19, 1976

[51] Int. Cl.² ............................................. A01D 35/264
[52] U.S. Cl. ...................................... 56/16.9; 56/503; 241/101.7; 241/186 R
[58] Field of Search ....................... 56/12.8, 12.7, 16.8, 56/13.2, 13.3, 17.5, 255, 295, 503, 16.9, 500, 501, 502; 241/101.7, 186 R; 83/444; 198/128

[56] References Cited

U.S. PATENT DOCUMENTS

| 3,688,479 | 9/1972 | Martinson et al. | 56/13.2 |
| 3,716,089 | 2/1973 | Bateman | 56/12.8 X |
| 3,808,782 | 5/1974 | McWilliams | 56/503 |
| 3,817,462 | 6/1974 | Hamlin | 241/101.7 |
| 3,841,571 | 10/1974 | Dankel et al. | 241/101.7 |
| 3,861,603 | 1/1975 | Lautzenheiser et al. | 241/101.7 X |
| 3,877,207 | 4/1975 | Lemelson | 56/16.9 X |
| 3,925,968 | 12/1975 | Wagenhals | 56/503 X |

Primary Examiner—Jay N. Eskovitz
Attorney, Agent, or Firm—Owen, Wickersham & Erickson

[57] ABSTRACT

A rotary lawn mower includes apparatus for chopping and shredding materials such as cuttings, etc. into a mulch and collecting the mulch in a storage facility attached to the mower's housing. The device includes three blades affixed to the same vertically oriented drive shaft, vertically spaced from one another and rotationally staggered. An uppermost blade chops articles as they are fed into the mower's housing from a hopper thereabove, and the blade below shreds the chopped articles by engaging them against pairs of opposed shredder bars between which the shredder blade passes. Following this, the shredded material is passed out of a side opening in the housing into the collecting container by the centrifugal action of the chopping and shredding blades and by a fan effect of a mower blade, which is lowermost on the drive shaft. A bottom plate may be secured over the opening at the bottom of the apparatus when it is to be used for chopping and shredding. With the bottom plate removed, the apparatus may be used as a rotary lawn mower.

2 Claims, 9 Drawing Figures

ROTARY MOWER AND SHREDDER DEVICE

BACKGROUND OF THE INVENTION

The invention relates to garden equipment, and more particularly to an apparatus suited both to mowing grass and to mulching brush clippings or other organic articles.

An implement for mulching brush clippings, garden trimmings and other cuttings is a very desirable addition to home gardening equipment. Such mulched organic matter is best used by returning it to the soil in the lawn or garden for decay and natural conversion into fertilizer. However, the mulching or shredding of cuttings or other matter can also serve simply to compact it, thereby facilitating its disposal. The gardening equipment of most homes does not include a mulcher, primarily because of expense, storage space required for the additional implement, and inconvenience in transporting such an implement to the location of the work.

It has been recognized that the power of a rotary type lawn mower can be utilized for mulching of organic matter, particularly cut blades of grass and leaves from the lawn itself. See, for example, U.S. Pat. Nos. 3,157,015 and 3,531,923, showing separate mowing and mulching blades on the shaft of a rotary mower. U.S. Pat. Nos. 2,701,992 and 3,836,024 show mower blades which coact with fixed backup supports adjacent to the path of blade travel, for severing, but not for mulching or shredding, organic articles.

The mounting of a material hopper on a rotary lawn mower has also been suggested, as in U.S. Pat. Nos. 2,847,224, 3,100,371 and 2,861,611. The latter patent shows a hopper mounted over an opening in the mower housing for feeding to the mowing blade various organic items such as corn stalks and leaves for cutting and distribution by the blade. However in general, the mower implements in use heretofore have not been capable of efficiently cutting and shredding materials, including relatively heavy brush clippings and other items fed from a hopper, and of delivering the shredded mulch to a collection container external of the mower housing. Those employing blades without any fixed coacting means were inefficient in that articles received in the housing would often be simply thrown around by the blades, inertia being depended upon to hold the items for cutting. Also, such devices utilizing only a single blade could not chop and shred articles into a relatively fine mulch, since an article once fed into the hopper was generally engaged only once or twice by the blade before dropping to the ground below.

Mulching lawn mowers of the prior art, particularly those provided with multiple blades, have been capable of mulching primarily only cut grass and leaves, and have not even included a material feeding hopper above the housing. No prior combined mowing and mulching device was capable of efficiently chopping and shredding a wide variety of types, sizes and toughnesses of articles, or of delivering the finely shredded mulch material into an external collecting container, to the extent of the apparatus of the present invention described below.

SUMMARY OF THE INVENTION

The present invention provides a combined rotary lawn mower and chopping and shredding apparatus which is highly efficient, versatile and portable, requiring no more storage space than an ordinary lawn mower, and which is not complex or expensive to manufacture.

The rotary mower and shredder device of the invention includes a material hopper mounted on the upper surface of a mower housing, in communication with an opening leading into the interior of the housing. In the lower end of the hopper a pair of opposed feed rollers may be provided, driven by a crank which may be operated by hand, since the apparatus is maintained stationary when used for shredding. The vertical output shaft from the motor supports three horizontal rotary blades, a lower moving blade, a shredding blade above, and an upper chopping blade. The shredding blade is cooperative with fixed material-stop means adjacent to its path so that material from the hopper can be engaged and shredded between the blade and the stop. The heavier chopping blade chops up articles as they first enter the housing from the hopper. Passing in close proximity to a flange or block depending from the housing on the downstream-blade side of the opening, the sharpened chopping blade positively severs articles as they are fed from the hopper, facilitating the handling of coarser, tougher and heavier brush and similar matter. The shape of the cutting portion of the blade is such that cut particles are pushed downwardly into the path of the shredding blade.

The housing of the apparatus is provided with a side opening similar to those of grass-blowing or grass-collecting type rotary mowers, with an external mulch collection bag removably secured over the opening. Thus mulched material may be collected in compact form for subsequent disposal or spreading. When the apparatus is used for lawn mowing, the collection bag may be used to collect cut grass or it may be removed, so that the cut grass is spread over the lawn. Such cut grass blades are advantageously used for mulch, since they are shredded into much smaller particles than with an ordinary lawn mower due to the presence of additional blades and air currents within the housing caused by the blades.

For complete containment of the shredded particles during the shredding or mulching operation, a removable bottom cover may be provided for the housing of the mowing and shredding implement, although the device may be operated without the cover with little loss of mulched material.

It is accordingly among the objects of the invention to provide a versatile, compact and relatively inexpensive combined lawn mower and material shredder which is effective on both light and relatively heavy brush clippings and other articles to positively chop and shred them into a mulch which may be collected for easy handling and disposal.

Other objects, advantages and features of the invention will become apparent from the following detailed description of one embodiment taken in conjunction with the accompanying drawing.

DESCRIPTION OF THE PREFERRED EMBODIMENT

Figure 1:
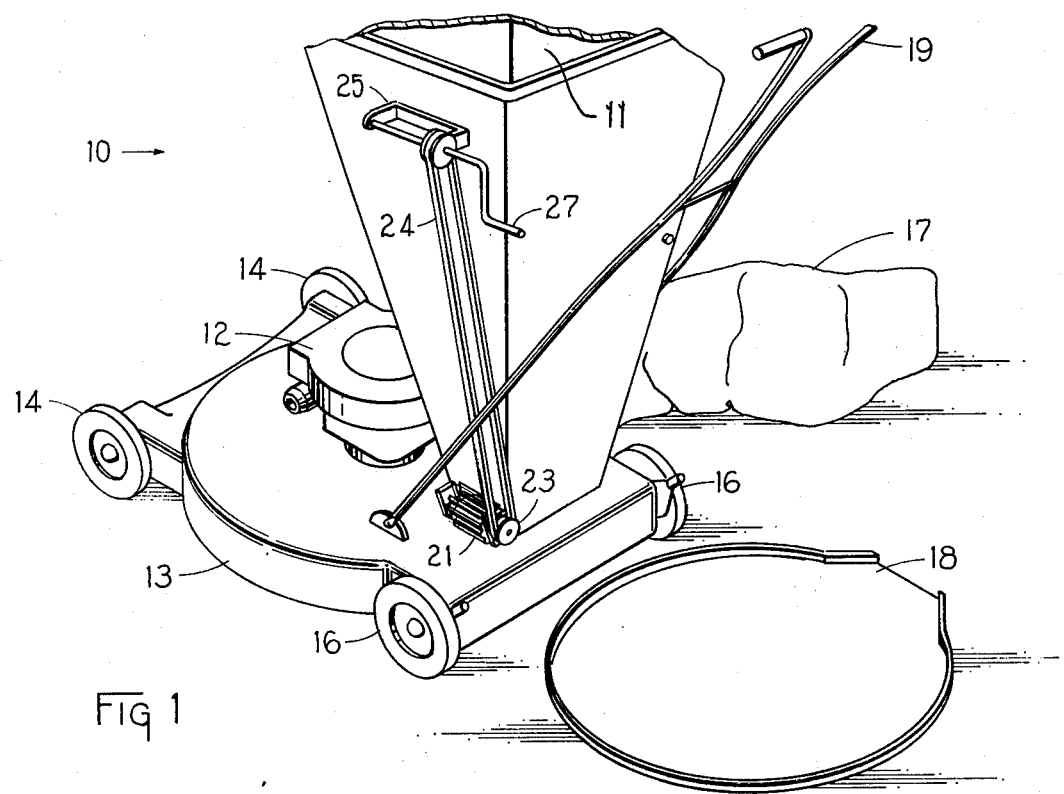
FIG. 1 is a perspective view of a mowing and shredding device according to the invention.

In the drawings, FIG. 1 shows a rotary mower and shredder device 10 according to the invention, including a material hopper 11, a vertical-shafted motor 12 mounted on the upper surface of a housing 13 which is supported on height-adjustable front and rear wheels 14 and 16, respectively, a removable shredded material bag 17, a removable bottom cover 18 for the housing, and a handle 19 connected to the housing. When the apparatus 10 is being pushed by an operator during the mowing of a lawn, the bottom cover 18 is removed from the housing 13. The bag 17 is preferably also removed, unless it is desirable to collect cut grass blades. However, when the apparatus 10 is to be used for shredding or mulching of material fed through the hopper 11, the apparatus remains stationary, the bottom cover 18 is preferably applied and the bag 17 is attached to collect shredded or mulched material.

Figure 2:
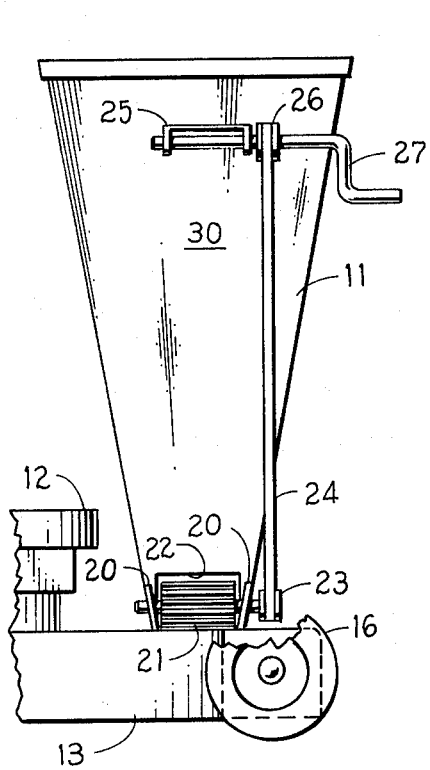
FIG. 2 is a side elevational view of the device.

FIG. 2 shows a portion of the apparatus 10, particularly the hopper 11, in side elevational view. As indicated, the hopper 11 supports, via brackets 20, a feed roller 21 cooperative with an opening 22 in a side 30 of the hopper for engaging material within the hopper and feeding it downwardly into the interior of the housing 13. For driving the feed roller 21, a pulley 23 connected to the roller is in engagement with a belt 24 engaged over another pulley 26 affixed to a hand crank 27 rotatably mounted on a bracket 25 near the top of the hopper. As FIG. 2 indicates, the hopper 11 is tapered from top to bottom, with a width only slightly larger than the feed roller 21 at the feed area.

Figure 3:
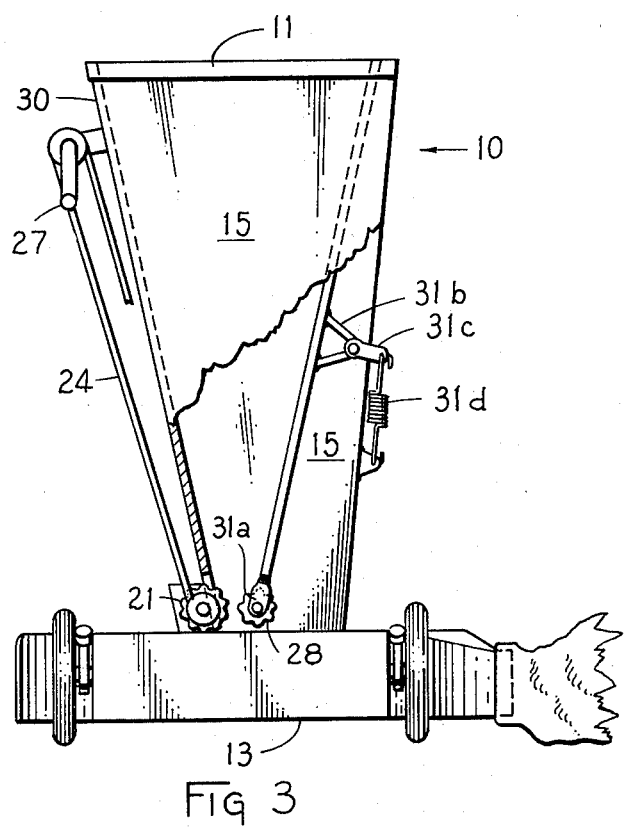
FIG. 3 is a partially sectioned rear elevational view of the device.

FIG. 3 shows the mowing and shredding device 10 in rear elevation, indicating the cooperation between the feed roller 21 at the bottom of the angled. stationary side 30, and an inner pressure roller 28 which is rotatably mounted at the bottom of an angled, pivoted side 31 to provide a yieldable and rotatable pressure surface against which articles of various sizes engaged by the feed roller 21 can be squeezed for positive feeding action. The side walls 30 and 31 taper inwardly to the surfaces of the rollers 21 and 28 for guiding material to the engaging area between the rollers. A lower end 31a of the hopper wall 31 rotatably supports the pressure roller 28, with the wall 31 supported by brackets 31b at either side of the wall 31, pivotally connected to opposed front and rear walls 15 of the hopper, as indicated in FIG. 3. Each bracket has an extending arm 31c connected to a tension spring 31d which is anchored to one of the hopper walls 15, so that the pressure roller 28 is biased toward the driven feed roller 21. Although the pivoted wall 31 is trapezoidal and is movable between converging front and rear walls 15, it nonetheless does not jam between the walls, since the required pivoting arc is very small and sufficient tolerance is provided. The surfaces of the rollers 21 and 28 preferably consist of a material such as rubber which has good friction characteristics.

Figure 4:
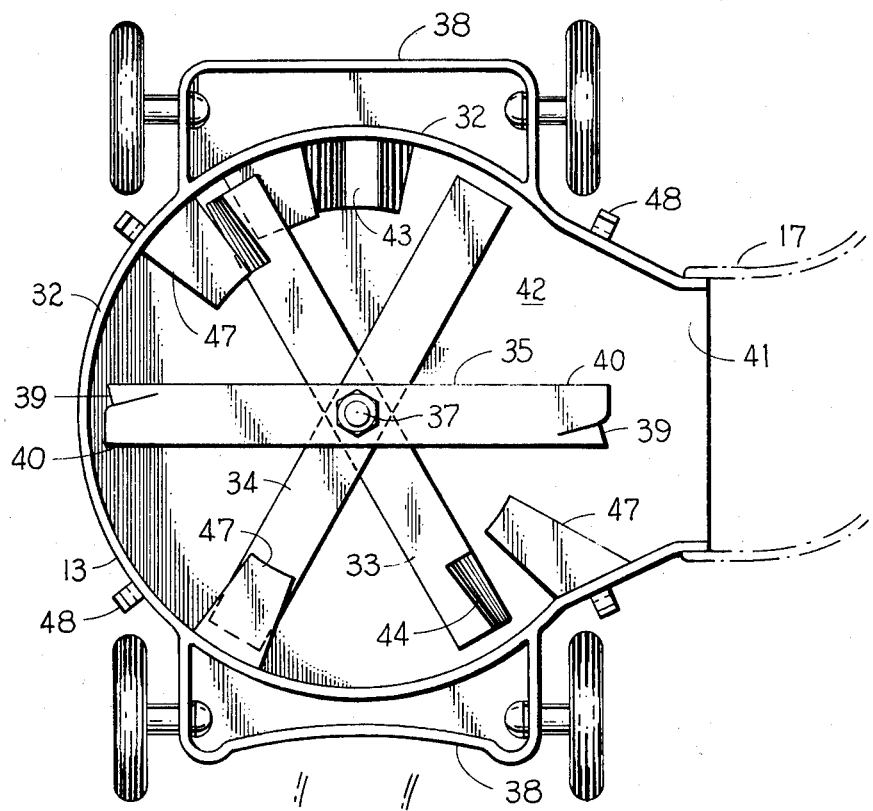
FIG. 4 is a bottom plan view illustrating chopping, shredding and mowing blades.
Figure 5:
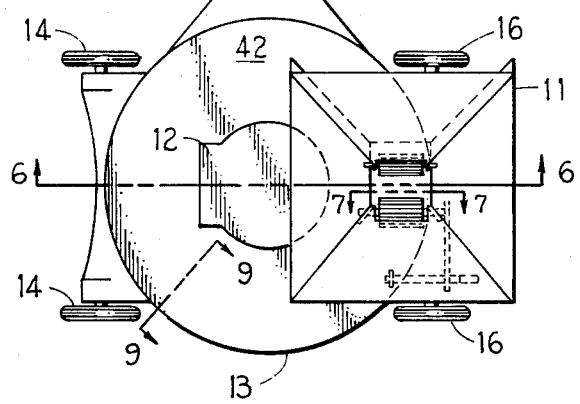
FIG. 5 is a schematic top plan view.

FIG. 4 shows the housing 13 in bottom plan view. The housing includes a large circular skirt 32 which enshrouds three rotating blades 33, 34 and 35 affixed to a motor output shaft 37 in rotationally staggered relationship. The blades are also spaced vertically from one another as seen in the figures discussed above. The shaft 37 and the blades 33, 34 and 35 rotate in a clockwise direction, so that in the bottom plan view of FIG. 4, they would appear to be rotatable in a counterclockwise direction. As the figure indicates, the housing 13 also includes wheel-supporting end flanges 38.

Figure 6:
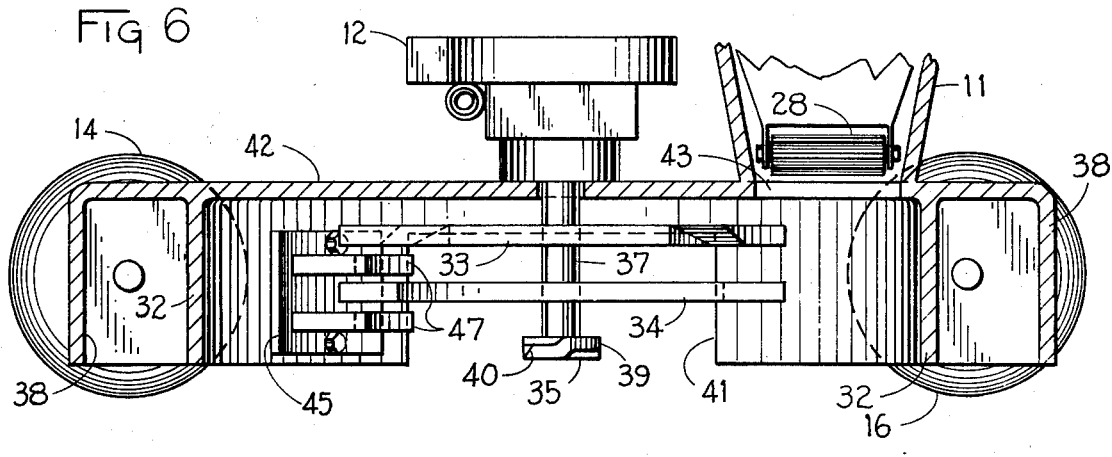
FIG. 6 is an enlarged sectional elevational view, taken along the line 6—6 of FIG. 5, showing the blades not in section.

Each of the three blades has a specific purpose. The mower blade 35, lowest of the three blades, functions in the usual manner as a rotary lawn mowing blade. It is preferably provided with fan-shaped portions 39 at the blade ends, adjacent to the trailing edges of the blade, as shown in FIGS. 4 and 6. The leading edges define grass cutting surfaces 40. The purpose of the fan-shaped portions 39 is to effect the upward and outward movement of air within the housing 13, so that blades of grass cut by the blade 35 or mulched materials from the other blades are adequately circulated within the housing 13 and exhausted through a right side opening 41 in the housing for spreading or for collection in the bag 17.

The chopping blade 33, uppermost of the three blades and closest to the upper panel 42 of the housing 13, severs large and small articles into smaller pieces as they enter the housing 13 through an opening 43 in the panel 42 just below the feed and pressure rollers 21 and 28. The chopping blade preferably is much heavier, with a much larger moment of inertia, than the mowing blade, so that it is capable of cutting tough materials without appreciable resistance. The blade thus acts as a flywheel, storing rotational inertia energy so that when heavy trimmings, tree branches, etc. are incrementally fed through the hopper the blade slows only slightly and momentarily, delivering a very high amount of cutting energy as compared to the horsepower of the motor 12.

Figure 7:
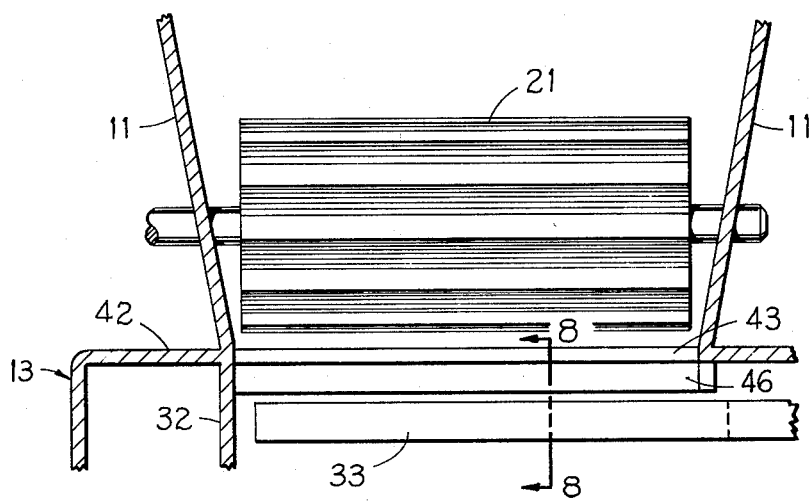
FIG. 7 is an elevational sectional view of a portion of the device, taken along the line 7—7 of FIG. 5, illustrating a feed roller and a chopping assembly.
Figure 8:
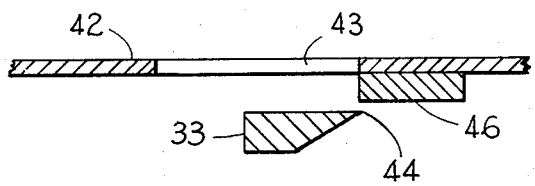
FIG. 8 is an elevational sectional view taken along the line 8—8 of FIG. 7.

The chopping is accomplished between a leading sharpened edge 44 of the blade 33 and a fixed chopping bar 46 mounted immediately adjacent to but "downstream" of the housing opening 43. As shown in the sectional elevational views of FIGS. 7 and 8, the chopping blade 33 passes just below the chopping bar 46, so that articles fed by the feed roller 21 down through the housing opening 43 and alongside the chopping bar 46 are braced by the chopping bar 46 as they are severed in a shearing and knife-cutting type action between the bar 46 and the cutting surface 44 of the blade 33. The cutting portions of the blade are preferably wedge-shaped, with the cutting edge 44 located at the upper surface as shown in FIG. 8, so that cut particles are driven downwardly into the path of the shredding blade 34 below. In FIG. 7 the trailing edge of the chopping blade 33 is shown, with the blade moving away from the viewer toward the chopping bar 46. In FIG. 6 the chopping blade 33 is foreshortened and the end appearing on the right is moving toward the viewer. The chopping bar is not visible in this view.

Figure 9:
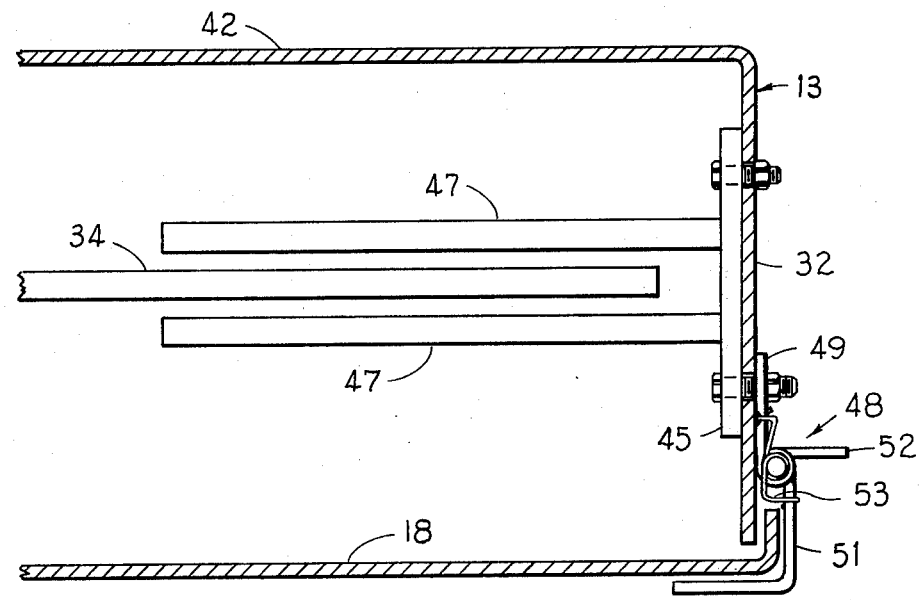
FIG. 9 is an elevational sectional view of another portion of the device, taken along the line 9—9 of FIG. 5, illustrating a shredding assembly.

The shredding blade 34, below the chopping blade 33, receives chopped material and shreds it into relatively fine mulch through cooperation with three pairs of fixed shredding bars 47. The shredding blade preferably does not include a sharpened cutting edge, since it shreds rather than cuts. Like the chopping blade 33, the shredding blade preferably has a somewhat higher moment of inertia than the mowing blade so that it is not easily slowed by incrementally heavy loading. As best seen in FIGS. 6 and 9, each pair of upper and lower shredding bars 47 are affixed to the interior of the circular skirts 32 of the housing 13 to extend horizontally inwardly, with one bar of each pair above the path of the shredding blade 34 and one bar below this path. The shredding bars may be welded directly to the housing skirt 32 or bolted to it via plates 45. Materials from the chopping blade 33 which are caught between the shredding blade 34 and the fixed shredding bars 47 are sheared or drawn apart into finer fibers and particles, then are blown by air currents within the housing 13 to the exhaust opening 41 and into the collection bag 17, if desired. As discussed above, this chopping and shredding operation may be accomplished with the bottom of the housing left open, with little loss of mulch material. However, the bottom cover 18 may be applied over the open bottom defined by the circular housing skirt 32, as shown in FIG. 9, to prevent loss of any material. Spring clips 48 may be provided around the exterior of the housing skirt 32 as shown in FIG. 9 for releasably retaining the bottom plate 18 over the bottom of the apparatus. Each spring clip 48 may comprise a fixed leg 49 supported on the housing skirt 32, and a pivoted leg 51 supported by the fixed leg 49 and including a tab 52 engageable by the operator for releasing the spring clip 48. A torsion spring 53 may be included to urge the pivoted leg 51 toward the engaged position.

The above described preferred embodiment provides a combination rotary mower and shredding or mulching device which is inexpensive to manufacture and maintain and which is effectively and efficiently used, stored and transported around the home and garden. Various other embodiments and minor alterations to this preferred embodiment will be apparent to those skilled in the art and may be made without departing from the spirit and scope of the following claims.

I claim:

1. A rotary lawn mower apparatus adapted to cut and shred light and relatively heavy articles as well as cutting grass, comprising:
   a housing mounted on wheels so as to be close to the ground, and including a horizontal upper wall and an open bottom;
   an opening in said horizontal upper wall of the housing;
   a hopper mounted on the upper side of the housing over said opening;
   roller-type feeding means mounted on the hopper for feeding material from the hopper down through the opening into the housing, including relatively heavy articles;
   a vertically oriented, motor driven shaft extending substantially through the height of the housing and mounted for rotation within the housing;
   a cutting and chopping blade in the housing affixed horizontally to the shaft close to said horizontal upper wall of the housing, having opposed sharp cutting ends positioned below the housing opening and adapted to cut articles entering the housing from the hopper;
   said horizontal upper wall of the housing having bracing means affixed to its under side, at the downstream side of the opening, extending into close proximity with the path of said sharp cutting ends of the cutting and chopping blade, for bracing relatively heavy articles as they enter the housing from the hopper and are engaged by said cutting ends;
   a shredding and mulching blade affixed horizontally to the shaft, spaced below and rotationally staggered from the cutting and chopping blade, and having opposed shredding ends;
   said housing having pairs of vertically spaced shredder bars affixed to its inside periphery and positioned in registry with one another above and below the path of said shredding ends such that articles engaged between the shredding ends and the shredder bars will be shredded;
   a grass mowing blade affixed horizontally to the shaft so as to be close to the ground, spaced below and rotationally staggered from the shredding and mulching blade, and having opposed mowing ends adapted to mow grass when the housing is advanced on its wheels; and
   said cutting and chopping blade having a substantially higher moment of inertia about its rotational axis than said mowing blade;
   whereby, in addition to cutting grass, the apparatus will cut and shear off organic articles, including relatively heavy articles, as they are fed in from the hopper, and shred them into a fine mulch.

2. The apparatus of claim 1 which further includes a removable bottom panel for attachment over the open underside of the housing, whereby the apparatus can be operated in a stationary position for cutting and shredding of materials without mowing.

* * * * *

UNITED STATES PATENT AND TRADEMARK OFFICE
CERTIFICATE OF CORRECTION

PATENT NO. : 4,057,952

DATED : November 15, 1977

INVENTOR(S) : GEORGE K. BROKAW

It is certified that error appears in the above-identified patent and that said Letters Patent are hereby corrected as shown below:

Col. 1, line 27, "Pat. Nos. 2,701,992 and 3,836,024" should read --Pat. Nos. 2,701,942 and 2,836,024--.

Signed and Sealed this

Sixth Day of June 1978

[SEAL]

Attest:

RUTH C. MASON
*Attesting Officer*

DONALD W. BANNER
*Commissioner of Patents and Trademarks*